United States Patent
Debert et al.

(10) Patent No.: US 9,306,249 B2
(45) Date of Patent: Apr. 5, 2016

(54) METHOD FOR ESTIMATING THE TEMPERATURE AT THE CORE OF A BATTERY CELL

(75) Inventors: Maxime Debert, Versailles (FR); Ahmed Ketfi-Cherif, Elancourt (FR); Guillaume Colin, Olivet (FR); Yann Chamaillard, Le Bardon (FR)

(73) Assignee: RENAULT S.A.S., Boulogne-Billancourt (FR)

( * ) Notice: Subject to any disclaimer, the term of this patent is extended or adjusted under 35 U.S.C. 154(b) by 100 days.

(21) Appl. No.: 14/345,030

(22) PCT Filed: Sep. 12, 2012

(86) PCT No.: PCT/FR2012/052042
§ 371 (c)(1),
(2), (4) Date: Apr. 10, 2014

(87) PCT Pub. No.: WO2013/038109
PCT Pub. Date: Mar. 21, 2013

(65) Prior Publication Data
US 2014/0377605 A1    Dec. 25, 2014

(30) Foreign Application Priority Data
Sep. 15, 2011  (FR) .................................. 11 58228

(51) Int. Cl.
*H01M 10/48* (2006.01)
*H01M 10/633* (2014.01)
*G01K 1/20* (2006.01)
(Continued)

(52) U.S. Cl.
CPC ............... *H01M 10/486* (2013.01); *G01K 1/20* (2013.01); *H01M 10/5022* (2013.01); *H01M 10/613* (2015.04); *H01M 10/633* (2015.04); *H01M 10/635* (2015.04)

(58) Field of Classification Search
CPC .......... H01M 10/486; H01M 10/5022; H01M 10/613; H01M 10/633; H01M 10/635; G01K 1/20
See application file for complete search history.

(56) References Cited

U.S. PATENT DOCUMENTS

| 8,936,394 B2 * | 1/2015 | Kenkre | H01M 10/425 374/100 |
| 2007/0298316 A1 * | 12/2007 | Yamamoto | H01M 10/425 429/62 |

(Continued)

FOREIGN PATENT DOCUMENTS

| DE | 10 2009 037 088 | 2/2011 |
| EP | 1 816 700 | 8/2007 |
| JP | 9 92347 | 4/1997 |

OTHER PUBLICATIONS

International Search Report Issued Jan. 3, 2013 in PCT/FR12/052042 Filed Sep. 12, 2012.

(Continued)

*Primary Examiner* — Carlos Barcena
(74) *Attorney, Agent, or Firm* — Oblon, McClelland, Maier & Neustadt, L.L.P.

(57) ABSTRACT

A method of estimating temperature at a core of a module of a traction battery of an electric or hybrid vehicle in which is packaged a plurality of electric charge accumulating elements, the method including: measuring a temperature at a level of an exterior wall of the battery module; and calculating an estimation of the temperature at the core of the battery module on the basis of the measurement of the temperature.

8 Claims, 1 Drawing Sheet

(51) Int. Cl.
  *H01M 10/635* (2014.01)
  *H01M 10/613* (2014.01)

(56) References Cited

U.S. PATENT DOCUMENTS

2010/0033132 A1 2/2010 Nishi et al.
2011/0199053 A1 8/2011 Minamiura
2011/0299564 A1* 12/2011 Leutheuser ............ G01K 7/427
  374/134
2012/0109554 A1* 5/2012 Lin ................... H01M 10/0525
  702/63
2015/0147608 A1* 5/2015 Lin ..................... H01M 10/052
  429/62

OTHER PUBLICATIONS

French Search Report Issued May 8, 2012 in French Patent Application No. 1158228 Filed Sep. 15, 2011.

* cited by examiner

METHOD FOR ESTIMATING THE TEMPERATURE AT THE CORE OF A BATTERY CELL

The present invention relates to a method for estimating the temperature at the core of a traction battery module of an electric or hybrid vehicle, a module in which a plurality of electrical charge accumulation elements, commonly called cells, are packaged.

One application of the method according to the invention relates to the management of a battery of electrical charge accumulation elements notably during its operation in an electric or hybrid vehicle. It is more particularly intended to be applied to the operation of the battery to estimate in real time the internal temperature of the charge accumulation elements, notably in the context of optimizing the energy and heat management strategies in order to guarantee the safety of the battery and an optimized use of the energy potential of the battery.

The traction battery used on electrical or hybrid vehicles is one of the most critical components of such a vehicle. The temperature of the battery is a deciding factor conditioning its performance levels, notably because of its impact on the chemical reaction kinetics within the charge accumulation elements that make up the battery. In particular, high temperatures tend to increase the spurious reactions, which leads to a lowering of the available capacity of the battery and an increase in the internal resistance. Because of this, the temperature is an ageing factor with respect to the elements that make up the battery. Furthermore, there is a risk of thermal runaway of the batteries beyond a certain temperature. The accurate and reliable knowledge of the temperature of the battery is therefore essential to be able to act accordingly in the case of overheating and, more generally, to be able to implement in the vehicle a heat management strategy specifically for ensuring optimized operation of the battery, in safety, functional and lifetime terms.

Also, it is known practice to arrange temperature sensors on the outer walls of the battery modules in which the charge accumulation elements are packaged, to supply a measurement of the temperature of the battery. However, this battery temperature information measured by the sensor is attenuated and offset in time relative to the temperature at the core of the module, for physical reasons of diffusion of the heat within the charge accumulation elements. The heat is in fact produced in the charge accumulation elements by Joule effect and then is diffused in the battery packaging material to then be dissipated toward the outside environment via a convectional exchange on the outer walls. Consequently, this temperature information does not accurately reflect the temperature at the core of the battery module, that is to say the internal temperature of the charge accumulation elements, at the point where the heat is produced, and does not therefore make it possible to act effectively on the limitation of the battery temperature rise.

Since this temperature cannot be measured, it then has to be estimated. There is known, for example from the document US 2007/01 3901 7, a method for estimating the temperature of the battery, in order to obtain an improvement in accuracy compared to an external measurement. The method according to this document is based on an estimation of the initial thermal state of the battery, linked to the temperature outside the vehicle, and on an estimation of the heat generated inside the battery, devolving, for example, from the measurement of the resistance of the battery and from the measurement of the current through the battery, in order to estimate the temperature representative of the internal temperature of the battery.

This estimation method, which takes into account the heat generated inside the battery, does, however, neglect the problem of diffusion of the heat in the battery, which unfavorably affects the accuracy and the reliability of the temperature estimation obtained.

In this context, the aim of the present invention is to propose a method for estimating the temperature at the core of a traction battery module of an electric or hybrid vehicle, which is free of the drawbacks described above.

To this end, the method of the invention is essentially characterized in that the temperature is measured on an outer wall of the battery module and an estimation of the temperature at the core of the battery module is computed from the measurement of the temperature.

According to a particularly advantageous embodiment, a diffusion model of the heat produced in the charge accumulation elements of the battery module is established, the model supplying as output an estimation of the temperature on the outer wall of the battery module as a function of the temperature at the core of the module that it receives as input, and the estimation of the temperature at the core of the battery module is computed by determining a temperature value to be supplied as input for the model to obtain as output from the model, a temperature value substantially equal to the measured temperature.

Preferably, the temperature value to be supplied as input for the model is determined such that the difference between the temperature measured on the outer wall and the output temperature of the model is substantially zero.

According to this embodiment, the temperature of the ambient air and the current at the terminals of the battery module are also measured, the diffusion model taking these measurements as input.

Advantageously, the diffusion model of the heat produced in the charge accumulation elements of the battery module is established by applying the equation of the heat at each node of a one-dimensional spatial mesh of the battery module.

The invention also relates to an energy management device for a traction battery of an electric or hybrid vehicle made up of a plurality of electrical charge accumulation elements packaged in at least one battery module, comprising:
  a first measurement member arranged on an outer wall of the battery module and suitable for supplying a measurement of the temperature on the outer wall of the battery module,
  a processing module, connected to the first measurement member, for receiving the measurement of the temperature on the outer wall of the battery module and suitable for generating an output signal representative of the temperature at the core of the battery module, computed by the method according to the invention, and
  a control module suitable for ensuring the energy management of the battery in response to the output signal generated by the processing module.

Advantageously, the control module is suitable for controlling the cooling of the battery in response to the output signal generated by the processing module.

Preferably, the device can comprise a second and a third measurement member suitable for supplying, respectively, a measurement of the temperature of the ambient air and a measurement of the current at the terminals of the battery module, and the processing module comprises an input means connected to the second and third measurement members to receive the measurements of the temperature of the ambient air and of the current.

Other features and advantages of the invention will become more clearly apparent from the following description, given by way of indication and in a non-limiting manner, with reference to the attached drawings in which.

Figure 1:
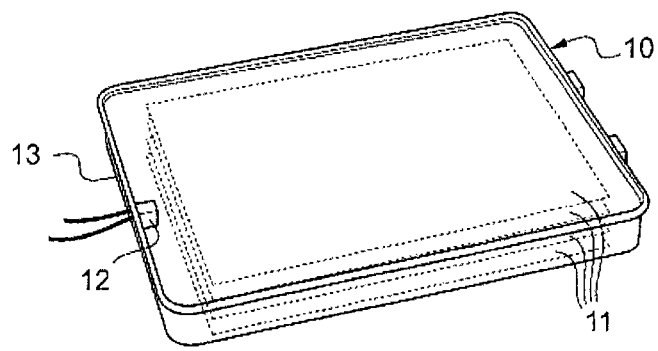
FIG. 1 is a schematic view of a battery module.

FIG. 1 illustrates a battery module 10 in which four charge accumulation elements 11, or cells, are packaged. A temperature sensor 12 is placed on an outer wall 13 of the battery module 10 to supply a measurement of the temperature on the outer wall 13 of the battery module 10. On the other hand, the temperature at the core of the battery module cannot be measured. To estimate this temperature, it is proposed, according to the invention, to use a correlated variable, which can be measured, in this case the temperature on the outer wall of the battery module.

For this, according to the invention, it is planned to develop a specific processing module or "software sensor", also called observer, implementing a model, which will be described in more detail below, that reproduces in a virtual manner the dynamic of the diffusion of the heat in the battery module. This virtual sensor is connected in a servocontrol loop with a physical sensor for measuring the temperature on the wall of the module, the loop making it possible to cancel any error between the estimation of the virtual sensor and the measurement from the physical sensor. The observer is thus designed to deliver, at each instant, an estimation of the temperature at the core of the battery module.

Figure 2:
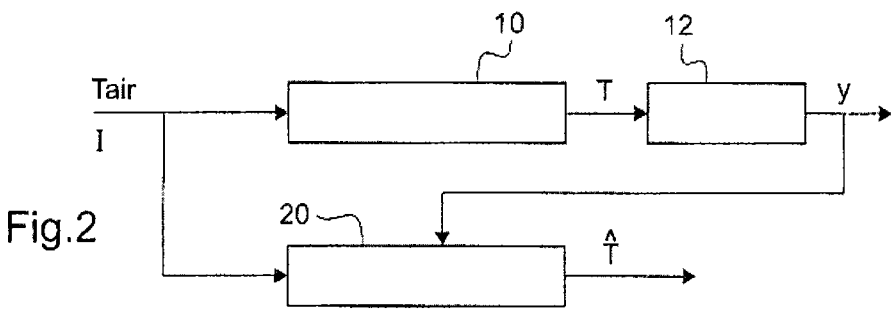
FIG. 2 is a block diagram illustrating the operation of the estimation method according to the invention.

More specifically, with reference to FIG. 2, let T be the temperature at the core of the battery module 10, and f represents the estimation of this temperature computed by a processing module 20 (observer). This estimation is therefore made by implementing a model of the dynamic of the temperature in the battery module 10, by also taking into account the inputs, which are the temperature of the ambient air Tair and the current I passing through the battery module, but also by using the measurement y of the temperature on the wall supplied by the sensor 12 in order to correct any possible deviations.

Figure 3:
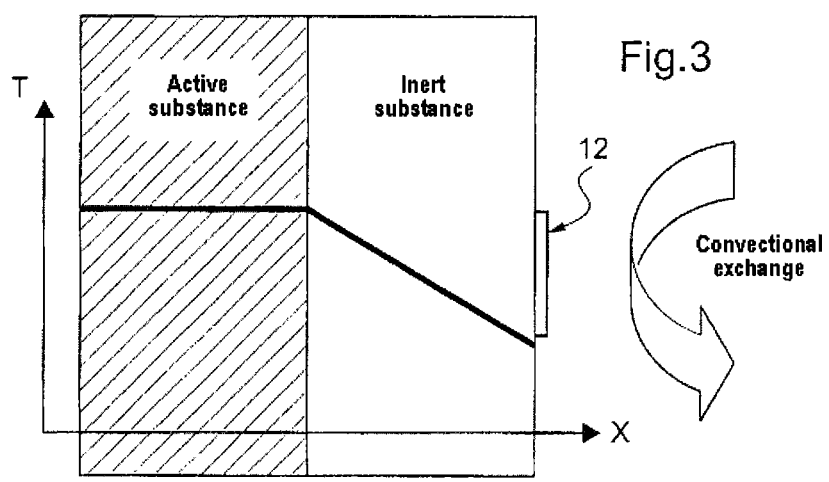
FIG. 3 is a diagram illustrating a diffusion model of the temperature in a battery module for implementing the estimation method according to the invention.

The modeling of the heat diffusion in the battery module must be such that the model is sufficiently representative of the reality, but also not intensive in terms of computing time for real time implementation. For this, as illustrated in FIG. 3, the variation of the temperature in the battery module can be broken down into two parts. In the active material (that is to say the cells), the temperature can be assumed uniform, while the heat diffusion phenomena (that is to say the lowering of the temperature) can be observed in the packaging material. The edge effects are disregarded and all the convectional exchanges are grouped together in one dimension.

The problem can therefore be likened to a problem of non-standing conduction in a semi-infinite wall with a converted exchange as limiting condition. An energy balance, which represents all the equations giving the trend of the temperature as a function of the heat flows generated in the operation of the battery and the expression of the Fourier law (semi-empirical law devised by Jean-Baptiste Biot which expresses the link between heat flux density and temperature gradient) leads to the general heat conduction equation. Take a domain D surrounded by its boundary Γ, the temperature field T(x, t), with $\vec{x}=\{x, y, z\}$ as the spatial coordinates, is governed by:

$$\Re(T) = \rho c_p \left( \frac{\alpha T}{\alpha t} + \vec{u} \cdot \vec{\nabla} T \right) - \vec{\nabla} \cdot (\lambda \vec{\nabla} T) - s = 0.$$

In which $\Re(T)$ designates the operator with the partial derivates governing the temperature field, $\rho c_p$ represents the product of the density by the specific heat capacity, û the fluid velocity field, $\vec{\nabla} T$ the temperature gradient, $\lambda$ the thermal conductivity coefficient and s the internal heat sources. This problem requires limiting conditions at the boundary r which can be of two types, namely either an imposed temperature condition or an imposed flux density condition. The problem must be simplified by discretizing it for battery computer computate capacity reasons.

Figure 4:
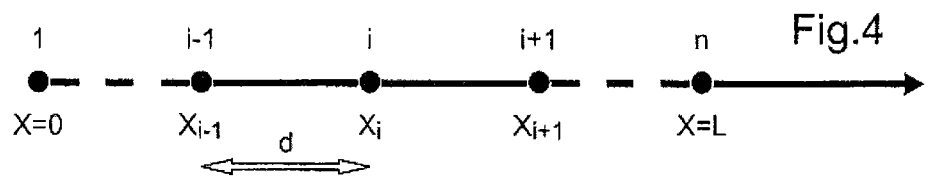
FIG. 4 is a diagram illustrating the spatial meshing of the battery module for the implementation of the estimation method according to the invention.

To this end, the battery module can be meshed one-dimensionally as illustrated in FIG. 4. A one-dimensional mathematical model is then established, by discretizing the equation of the heat at each node of a one-dimensional spatial meshing defined in the battery module. Each node is defined by an index between one and n, the distance X relative to the core of the module varying from 0 for the node of index 1 to L for the node of index n. One aim of the invention is therefore to estimate the temperature at the node of index 1 as a function of the temperature measured at the node of index n. Hereinafter in this application, the terms "node" and "point" will be used interchangeably.

In a one-dimensional problem in which the thermal conductivity $\lambda$ is assumed constant over the entire domain and assuming that there is no heat production within the domain or convectional exchange within the domain, the formulation is reduced to:

$$\Re_i(T) = \rho c_p \left( \frac{\partial T}{\delta t} \right)_i - \lambda \left( \frac{\delta^2 t}{\delta \chi^2} \right)_i = 0.$$

With i being the index of the point of the meshing illustrated in FIG. 4.

This system of equations is complemented by the two limiting conditions and the initial temperature conditions at each node. This equation allows spatial and temporal derivatives. The spatial derivatives are approximated using a 2nd order limited development around the point concerned. In the particular case where the spacing pitch d is constant, the previous equation becomes:

$$\rho c_p \frac{dT_i}{dt} - \frac{\lambda}{d^2}(T_{i-1} - 2T_i + T_{i+1}) = 0$$

with, as limiting condition at the point $x_l$ $$\rho c_v \frac{dT_1}{dt} - \frac{\lambda}{d}(T_2 - T_1) - s_i = 0,$$

with $s_i$=aRP being the nodal equivalence of the heat production (Joule effect) and, as limiting condition at the point $x_n$ $$\rho c_p \frac{dT_n}{dt} - \frac{\chi}{d}(T_{n-1} - T_n) + h_e(T_n - T_{air}) = 0,$$

with $h_e$ being the transfer coefficient at the boundary between D and the outside (n being the number of discrete points).

The previous formulation of the weak equation of the heat can be expressed in the following linear system status form:

$$\begin{cases} \begin{bmatrix} \frac{dT_1}{dt} \\ \vdots \\ \frac{dT_n}{dt} \end{bmatrix} = \begin{bmatrix} -\frac{\lambda}{\rho c_p d} & \frac{\lambda}{\rho c_p d} & 0 & \cdots & 0 \\ \frac{\lambda}{\rho c_p d^2} & -\frac{2\lambda}{\rho c_p d^2} & \frac{\lambda}{\rho c_p d^2} & \ddots & \vdots \\ 0 & \ddots & \ddots & \ddots & 0 \\ \vdots & \ddots & \frac{\lambda}{\rho c_p d^2} & -\frac{2\lambda}{\rho c_p d^2} & \frac{\lambda}{\rho c_p d^2} \\ 0 & \cdots & 0 & \frac{\lambda}{\rho c_p d} & -\frac{\lambda}{\rho c_p d} - h_e \end{bmatrix} \begin{bmatrix} T_1 \\ \vdots \\ T_n \end{bmatrix} + \begin{bmatrix} \alpha R & 0 \\ 0 & \vdots \\ \vdots & 0 \\ 0 & h_e \end{bmatrix} \begin{bmatrix} I^2 \\ T_{air} \end{bmatrix} \\ y = [0 \ldots 0 \ 1] \begin{bmatrix} T_1 \\ \vdots \\ T_n \end{bmatrix} \end{cases}$$

y is the temperature measured by the sensor on the outside of the wall. The presence of the energy balance in the model according to the invention makes it possible to perform a simulation of the diffusion of the heat in the battery module 10, coupled with the trend of the temperature of the ambient air and of the current at the terminals of the battery module, to supply as output of the module 20 an estimated value of the temperature on the outer wall 13 of the battery module 10.

The preceding model then serves as a basis for the processing module 20 (observer). It is, however, essential to make a certain correction to check the convergence (validity of the information). This shade of difference is provided via the difference measured between the output of the model f and the measured value y of the temperature on the wall supplied by the temperature sensor 12. The equation of the observer is then written:

$$\begin{cases} \begin{bmatrix} \frac{d\hat{T}_1}{dt} \\ \vdots \\ \frac{d\hat{T}_n}{dt} \end{bmatrix} = \begin{bmatrix} -\frac{\lambda}{\rho c_p d} & \frac{\lambda}{\rho c_p d} & 0 & \cdots & 0 \\ \frac{\lambda}{\rho c_p d^2} & -\frac{2\lambda}{\rho c_p d^2} & \frac{\lambda}{\rho c_p d^2} & \ddots & \vdots \\ 0 & \ddots & \ddots & \ddots & 0 \\ \vdots & \ddots & \frac{\lambda}{\rho c_p d^2} & -\frac{2\lambda}{\rho c_p d^2} & \frac{\lambda}{\rho c_p d^2} \\ 0 & \cdots & 0 & \frac{\lambda}{\rho c_p d} & -\frac{\lambda}{\rho c_p d} - h_e \end{bmatrix} \begin{bmatrix} \hat{T}_1 \\ \vdots \\ \hat{T}_n \end{bmatrix} + \begin{bmatrix} \alpha R & 0 \\ 0 & \vdots \\ \vdots & 0 \\ 0 & h_e \end{bmatrix} \begin{bmatrix} I^2 \\ T_{air} \end{bmatrix} - K[y - \hat{y}] \\ \hat{y} = [0 \ldots 0 \ 1] \begin{bmatrix} \hat{T}_1 \\ \vdots \\ \hat{T}_n \end{bmatrix} \end{cases}$$

In which the symbol ^ above a variable represents the estimate of said variable by the observer, K is a gain matrix which ensures the convergence of the observer in a finite time and y is the value given by the temperature sensor 12 on the wall. The value of $\hat{T}_1$ represents the estimation of the temperature at the core of the battery module supplied as an output signal by the processing module 20 (observer). This estimation can be considered as a reliable value of the internal temperature of the charge accumulation elements. The processing module (observer) thus makes it possible to emulate a temperature sensor positioned at this point.

The output signal from the processing module 20 will be able to be used by a control module specifically for handling the battery energy management. For example, the control module will be able to control the cooling of the battery in response to the output signal generated by the processing module 20.

The estimation of the internal temperature of the elements of the battery obtained by virtue of the method of the invention is particularly advantageous, in that it constitutes a guarantee for an effective and safe operation of the capacity of the battery throughout the range of operation of the vehicle. In practice, the information supplied by the processing module (observer) considerably enhances the knowledge of the internal temperature of the battery modules. The information that it supplies thus makes it possible to improve the availability of the battery compared to a battery that does not have the observer. Furthermore, since the internal parameters of the battery depend on the temperature of the elements of the battery, the information supplied by the observer makes it possible to better estimate these parameters and, thereby, increase the reliability and the range of the electric and hybrid vehicles.

The invention claimed is:

1. A method for estimating temperature at a core of a module of a traction battery of an electric or hybrid vehicle in which are packaged a plurality of electrical charge accumulation elements, the method comprising:

measuring, using circuitry of the electric or hybrid vehicle, a temperature on an outer wall of the traction battery module;

establishing, using the circuitry, a diffusion model of heat produced in the electrical charge accumulation elements of the traction battery module, the diffusion model supplying as an output an estimation of the temperature on the outer wall of the traction battery module as a function of a temperature at the core of the traction battery module that the diffusion model receives as an input; and computing, using the circuitry, an estimation of the temperature at the core of the traction battery module by determining a temperature value to be supplied as the input for the diffusion model to obtain, as an output from the diffusion model, a temperature value substantially equal to the received measurement of temperature.

2. The method as claimed in claim 1, wherein the temperature value to be supplied as the input for the diffusion model is determined such that a difference between the temperature measured on the outer wall of the traction battery module and the output temperature of the diffusion model is substantially zero.

3. The method as claimed in claim 1, further comprising measuring, using the circuitry of the electric or hybrid vehicle, temperature of ambient air and current at terminals of the traction battery module, the diffusion model taking these measurements as inputs.

4. The method as claimed in claim 1, wherein the diffusion model of the heat produced in the electrical charge accumulation elements of the traction battery module is established by applying an equation of heat at each node of a one-dimensional spatial mesh of the traction battery module.

5. The method as claimed in claim 1, wherein the circuitry includes a temperature sensor arranged to measure the temperature on the outer wall of the traction battery module.

6. An energy management device for a traction battery of an electric or hybrid vehicle including a plurality of electrical charge accumulation elements packaged in at least one battery module, the energy management device for the traction battery of the electric or hybrid vehicle comprising:

a first measurement sensor arranged on an outer wall of the at least one battery module and configured to supply a measurement of temperature at the outer wall of the at least one battery module;

processing circuitry connected to the first measurement sensor configured to receive the measurement of the temperature at the outer wall of the at least one battery module, and to generate an output signal representative of a temperature at a core of the at least one battery module; and control circuitry configured to ensure energy management of the at least one battery module in response to the output signal generated by the processing circuitry, wherein processing circuitry generates the output signal based on establishing a diffusion model of heat produced in the electrical charge accumulation elements of the at least one battery module, the diffusion model supplying as an output an estimation of the temperature on the outer wall of the at least one battery module as a function of the temperature at the core of the at least one battery module that the diffusion model receives as an input, and estimating the temperature at the core of the at least one battery module by determining a temperature value to be supplied as the input for the diffusion model to obtain, as an output from the diffusion model, a temperature value substantially equal to the received measurement of the temperature.

7. The device as claimed in claim 6, wherein the control circuitry is configured to control cooling of the at least one battery module in response to the output signal generated by the processing circuitry.

8. The device as claimed in claim 6, further comprising a second measurement sensor and a third measurement sensor configured to supply, respectively, a measurement of temperature of ambient air and a measurement of current at terminals of the at least one battery module, wherein the processing circuitry includes an input thereof connected to the second and third measurement sensors to receive the measurements of the temperature of the ambient air and of the current, respectively.

\* \* \* \* \*